May 20, 1930. H. LAMPLOTA 1,759,121
COFFEE PERCOLATOR
Filed May 9, 1928 2 Sheets-Sheet 1

Inventor:
Hubert Lamplota

Patented May 20, 1930

1,759,121

UNITED STATES PATENT OFFICE

HUBERT LAMPLOTA, OF BRNO, CZECHOSLOVAKIA

COFFEE PERCOLATOR

Application filed May 9, 1928, Serial No. 276,453, and in Czechoslovakia December 9, 1927.

This invention relates to a coffee percolator and consists in the provision of a vessel having a bottom formed with a discharge aperture and provided with ribs or lugs whereon to support a filter paper or other suitable filtering element so as to enable the liquid to flow between the ribs or lugs to the discharge aperture. The percolating vessel is used in connection with a receiving vessel which may be jacketed for the reception of a heating liquid.

Figure 1:
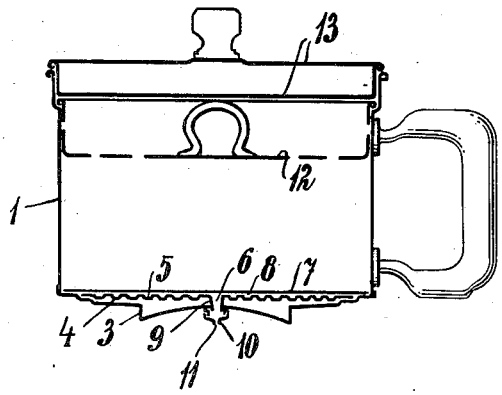
Figure 2:
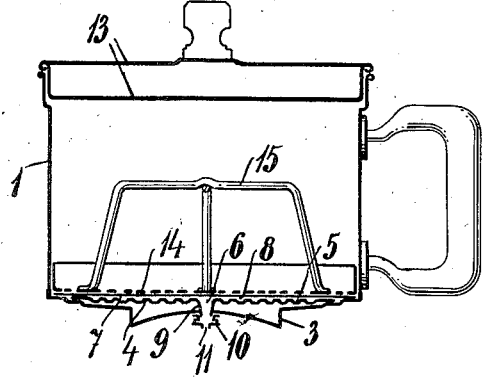
Figure 3:
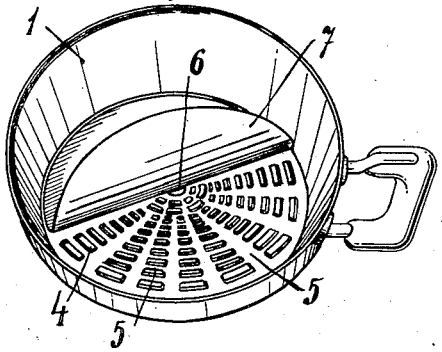
Figure 4:
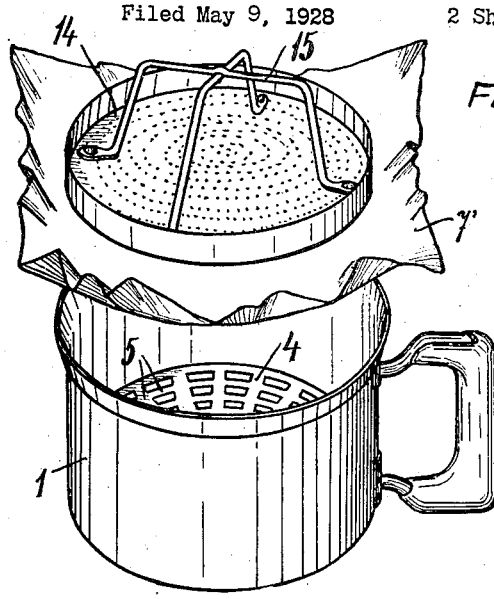
Figure 5:
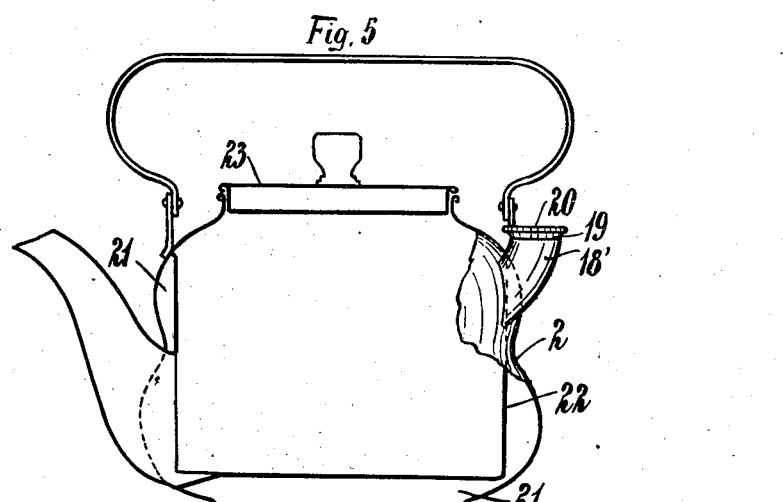

Fig. 1 of the accompanying drawings represents a vertical section of the percolating vessel according to one construction, Fig. 2, another vertical section showing a modified arrangement, Fig. 3, a perspective top view of the vessel showing the filtering element partly raised, Fig. 4, a perspective view of the arrangement shown in Fig. 2 but with a different filtering element in the course of being inserted, and Fig. 5, a view of a receiving vessel partly in section.

The device comprises a percolating vessel 1 having, in addition to a rigid, recessed bottom 3, a loose bottom plate 4 provided with a discharge aperture 6 and with ribs 5 whereon a filter paper 7 or the like can be supported so as to leave free passages 8 through which the liquid passing through the paper can flow to the discharge aperture. A perforated dish 12 may be supported in the upper part of the vessel, and a hollow lid 13 is provided which tends to retain the heat. The ground coffee is spread over the filter paper, and boiling water is poured in through the dish 12. The liquid percolates through the coffee and through the filter and is discharged through the aperture 6. In order to regulate the discharge so as to subject the coffee to a more or less brewing process, the discharge preferably opens into a nipple 9 to which a nozzle 10 having a more or less contracted orifice 11 is applied. Thus, a change in the rate of discharge can be effected by the application of nozzles of different sizes.

The percolating vessel is supported on a receiving vessel which may have the form of a kettle such as shown in Fig. 5. The kettle may be double-walled, and the jacket 21 formed between the walls 2 and 22 may be filled with water which is either originally hot or which may be heated by placing the kettle on a heating source. The jacket is filled through a funnel 18' provided with a stopper 19 in which there is an air and steam vent 20. The kettle may have a hollow lid 23 which replaces the percolating vessel after the coffee has percolated through.

In the arrangement shown in Fig. 2 a perforated dish 14 provided with handles 15 is placed on the filter paper. In this case the dish 12 may be omitted.

The filtering element may be composed of a cloth 7' of larger dimension than the vessel, the cloth being introduced and retained in position by means of the dish 14, as shown in Fig. 4.

I claim:

A coffee percolator comprising a vessel having a central discharge aperture, a loose bottom placed in said vessel, a nipple on said bottom adapted to project through the discharge aperture of the vessel, said bottom being formed with spaced lugs adapted to support a filtering element so that the liquid can flow between the lugs to the nipple, and a discharge nozzle fitted detachably on said nipple outside the vessel.

HUBERT LAMPLOTA.